United States Patent [19]

Spiero

[11] Patent Number: 4,570,075
[45] Date of Patent: Feb. 11, 1986

[54] OPTICAL END-OF-TAPE DETECTION DEVICE

[75] Inventor: Richard C. Spiero, Eindhoven, Netherlands

[73] Assignee: U.S. Philips Corporation, New York, N.Y.

[21] Appl. No.: 501,311

[22] Filed: Jun. 6, 1983

[30] Foreign Application Priority Data

Mar. 16, 1983 [NL] Netherlands ............... 8300947

[51] Int. Cl.$^4$ .................. G06K 7/10; G11B 15/08
[52] U.S. Cl. ................................. 250/570; 360/137; 360/74.6
[58] Field of Search .............. 360/71, 74.5, 74.6, 360/74.1; 250/561, 570, 221, 571; 242/188, 190; 226/45; 307/301, 520, 522, 518, 519

[56] References Cited

U.S. PATENT DOCUMENTS 3,739,177  6/1973  Ko ................................. 250/561
3,838,291  9/1974  Marion et al. ................. 250/561
3,859,647  1/1975  Ross ............................... 250/221
4,186,309  1/1980  Gnuechtel ...................... 250/561
4,320,423  3/1982  Frey et al. ..................... 360/74.6

FOREIGN PATENT DOCUMENTS 55-157138  12/1980  Japan ........................... 360/74.1
58-41460    3/1983  Japan ........................... 360/74.6

Primary Examiner—Raymond F. Cardillo, Jr.
Assistant Examiner—Steven R. Garland
Attorney, Agent, or Firm—Robert T. Mayer; Bernard Franzblau

[57] ABSTRACT

An optical end-of-tape detection device comprises a photodiode and a phototransistor. In order to distinguish the light emitted by the photodiode from the ambient light, the photodiode is operated in a pulsating fashion. Moreover, the low-frequency component of the photo current supplied by the photo-transistor is suppressed by negative current feedback.

8 Claims, 1 Drawing Figure

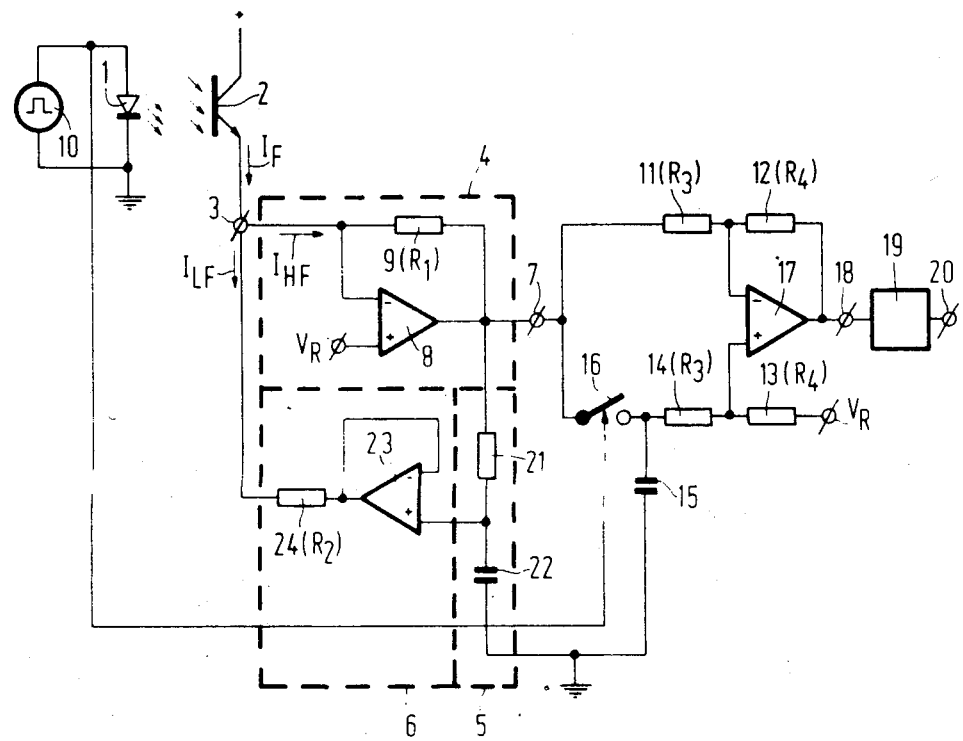

OPTICAL END-OF-TAPE DETECTION DEVICE

The invention relates to an optical end-of-tape detection device for use in a magnetic recording and/or playback apparatus, which device comprises a light source, a light-sensitive element which cooperates with said source, and a detection circuit which is coupled to said light-sensitive element.

Such devices are used in, inter alia, cassette recorders and serve to ensure that the tape drive stops when the end of tape is reached so as to preclude tape breakage. A disadvantage of this method is that the cassette and the apparatus must be light-tight to a very high degree to prevent the device from being influenced by ambient light (artificial light or daylight), which may lead to the cassette recorder being switched off erroneously. Apart from the constructional complexity entailed by this light-tightness, there is the further disadvantage that the freedom of design of the cassette is restricted. For example, the use of transparent cassettes is then impossible. Moreover, a separate transparent window must be provided in the cassette in order to check the amount of tape which is still available. All in all this renders the use of the inherently attractive optical end-of-tape detection unattractive.

It is an object of the invention to provide a device of the type mentioned in the opening paragraph in which the influence of ambient light is reduced substantially, and to this end the device is characterized by a modulator for modulating the light emitted by the light source so as to enable the detection circuit to distinguish the light emitted by the light source from ambient light.

It is desirable to operate the light-sensitive element as a current source because the output current then has a linear relation to the incident light and the amplitude of the current pulse produced by the pulsating light source is not influenced by the ambient light. As in the case of an element operated as a voltage source, problems arise because the currents of comparatively low frequency, which will be direct currents for daylight and currents of a frequency equal to twice the mains frequency for artificial light, will be situated outside the detection range of the detection circuit. In order to solve this problem a preferred embodiment of a device in accordance with the invention is characterized in that the light-sensitive element has the nature of a current source and the detection circuit comprises a current-voltage converter which is coupled to the photo-sensitive element and which, via a low-pass filter with a cut-off frequency which is lower than the frequency of the light-source modulation, is coupled to a voltage-current converter which, in order to compensate for the low-frequency current component is connected to the current-voltage converter, so that the low-frequency component of the current received by the current-voltage converter is reduced.

The invention may further be characterized in that the modulator is adapted to cause the light source to pulsate at a predetermined frequency and the detection circuit detects said light pulses synchronously.

This preferred embodiment may further be characterized in that the detection circuit comprises a differential amplifier having one input to which a signal to be detected is applied and having another input to which said signal is applied via a switch and a sample and hold capacitor. The switch is operated in synchronism with the light-source modulation and so that the difference between the applied signals is amplified in alternate phases of the light-source modulation.

The invention will now be described in more detail by way of example, with reference to the drawing, which shows a preferred embodiment of the invention.

The FIGURE shows a light source, in particular a photo-diode 1, whose emitted light can be detected by a photo-sensitive element, in particular a photo-transistor 2. Such a combination is used for detecting the transparent end of an otherwise opaque magnetic tape in a magnetic tape recorder, for example a video cassette recorder. The photo-transistor 2 supplies a photo-current $I_F$, which is proportional to the amount of light received, to an output 3 (the emitter). The output 3 is connected to a current-voltage converter 4 which converts an input current $I_{HF}$ into an output voltage at an output 7. This current-voltage converter comprises an operational amplifier 8 having a resistor 9 of a value $R_1$ arranged between its output and its inverting input and having its non-inverting input connected to a point at reference voltage $V_R$. As a result of this the voltage at the output 3 of the photo-transistor is maintained at the voltage $V_R$. Thus, the output voltage at point 7 is equal to $V_R - I_{HF}R_1$.

Without special shielding steps the photo-transistor 2 also receives ambient light in addition to the light emitted by the photo-diode. Therefore, without special measures it is not readily possible to distinguish a variation of the light received from the photo-diode 1 by the photo-transistor 2 from an ambient-light variation. Since optical shielding of the photo-transistor 2 from the ambient light may pose a problem, the invention has opted for an electronic solution, which consists in modulating the light emitted by the photo-diode 1 by means of a source 10 which, in the present example, generates a pulse-shaped signal, although in principle it is alternatively possible to select a different signal waveform. As a result of this, in addition to a component caused by ambient light, which component is a direct current in the case of daylight and a low-frequency current of a frequency equal to twice the mains frequency in the case of artificial light, the photo-current contains a pulsating component when the photo-transistor 2 receives light from the photodiode 1 (in the case of end-of-tape). This pulsating component is not present if the photo-transistor 2 does not receive light from the photodiode 1. Therefore, the end-of-tape can be detected by detecting said pulsating component. There are several possible ways to detect the pulsating component, such as narrow-band filtration for the frequency of the pulsations or synchronous detection.

In order to ensure that the output-signal amplitude is independent of the amount of ambient light, the photo-transistor 2 is operated as a current source so that the photo-current $I_F$ is largely proportional to the amount of light received. However, this has the drawback that the current $I_F$ has a low-frequency current component which may be comparatively strong depending on the ambient light, which component, in contradistinction to voltage components, cannot be isolated simply so that it is not unlikely that the input stage 4 of the circuit, which is coupled to the output 3 of the photo-transistor 2, will become saturated by said low-frequency current component. In order to solve this problem output 7 of the amplifier 4 is connected to a voltage-current converter 6 via the low-pass filter 5 comprising an RC-network made up of a resistor 21 and a capacitor 22. The converter 6 comprises an operational amplifier 23, arranged as a voltage follower, in series with a resistor 24 of the value $R_2$. The voltage-current converter 6 supplies a current $I_{LF}$ to output 3 of the photo-transistor 2. If the component $V_R - V_O$ at output 7, which as already stated is equal to $V_R - I_{HF}R_1$, has a low frequency, this component is applied to the resistor 24 via the follower 23, the other end of said resistor being connected to the output 3 carrying a voltage $V_R$. The current $I_{LF}$ then complies with $I_{LF} = (R1/R2)I_{HF}$ or $I_{HF} = R2/(R1 = R-2)I_F$. If $R_1 >> R_2$, the low-frequency component of the current $I_F$ from photo-transistor 2 is reduced by a factor R1/R2 and transferred to the current-voltage converter 4, thereby preventing saturation.

In the FIGURE the output 7 of the current-voltage converter 4 is connected to the inverting input of an operational amplifier 17 via a resistor 11 of a value $R_3$, which input is connected to the output 18 of said operational amplifier via a resistor 12 of the value $R_4$. The output 7 is also connected via a switch 16, which is operated via a synchronous source 10, and a resistor 14 of the value $R_3$ to the non-inverting input of the operational amplifier 17. The non-inverting input is connected to the point of reference voltage $V_R$ via a resistor 13 of the value $R_4$. The point between switch 16 and resistor 14 is connected to a sampling capacitor 15.

When the photodiode 1 does not emit light the switch 16 is closed. A signal $V_R - V_0$ then appears at output 7, $V_R$ being the aforementioned reference voltage and $V_0$ being a component as a result of the ambient light. This voltage then also appears on the capacitor 15. The same signal then appears on both inputs and the signal at output 18 is equal to $V_R$. If the photodiode 1 emits light, switch 16 is open. The signal $V_R - V_0 - V_S$ then appears at output 7, $V_R$ being the aforementioned reference voltage, $V_0$ the aforementioned component as a result of the ambient light, and $V_S$ being the component caused by the light received from the photodiode 1 by the photo-transistor 2. Since the signal $V_R - V_0$ appears on capacitor 15 the difference, i.e. the signal $V_S$, is amplified and the signal $V_R + R4/R3\ V_S$ appears at output 18. Thus, the influence of the ambient light is eliminated.

A further circuit 19, which processes the pulsating output voltage at output 18 may be connected to output 18, which circuit may be, for example, a low-pass filter, a sample-and-hold circuit or a gate circuit which is clocked in synchronism with the source 10 and which detects whether or not light is received from the photodiode 1 depending on the value of the signal $V_R + R4/R3\ V_S$, which is substantially equal to $V_R$ if an opaque magnetic tape is present between the photodiode 1 and the phototransistor 2 and which is comparatively high at the end of the tape where a transparent portion of the tape is situated.

What is claimed is:

1. An optical end-of-tape detection device for use in a magnetic recording and/or playback apparatus, said device comprising: a light source, a light-sensitive element having the characteristics of a current source and which cooperates optically with said light source to generate a signal to be detected, a detection circuit coupled to said light-sensitive element, and a modulator for modulating the light emitted by the light source to enable the detection circuit to distinguish the light emitted by the light source from ambient light, and wherein the detection circuit comprises a current-voltage converter coupled to the light-sensitive element and which, via a low-pass filter with a cut-off frequency lower than the frequency of the light-source modulation, is coupled to a voltage-current converter which, in order to compensate for a low frequency current component, is connected to the current-voltage converter so as to reduce the low-frequency component of the current received from the current-voltage converter.

2. An optical end-of-tape detection device as claimed in claim 1, characterized in that the modulator is adapted to cause the light source to pulsate at a predetermined frequency and the detection circuit includes means for detecting said light pulses synchronously, characterized in that the detection circuit comprises a differential amplifier having one input to which the signal to be detected is applied and having another input coupled to a capacitor, to which another input said signal is applied via a switch operated in synchronism with the light-source modulation so that the difference between the applied signals is amplified in alternate phases of the light-source modulation.

3. An optical end-of-tape detection device as claimed in claim 1, wherein the modulator includes means for pulsing the light source at a predetermined frequency and the detection circuit includes means for detecting said light pulses synchronously.

4. An optical end-of-tape detection device as claimed in claim 3, wherein the detection circuit comprises a differential amplifier having one input to which said signal to be detected is applied and having another input coupled to a capacitor, to which another input said signal is applied via a switch connected between an output of the current-voltage converter and said another input of the differential amplifier, said switch being operated in synchronism with the light-source modulation so that the difference between the applied signals is amplified in alternate phases of the light-source modulation.

5. An optical end-of-tape detection device for use with a tape in a tape recorder comprising: a light source, a light-sensitive element operative as a current source and adapted to receive light from the light source at the end of tape and to receive ambient light that produces a low frequency photocurrent component, a detection circuit having an input coupled to said light-sensitive element, and means for modulating the light of the light source at a high frequency relative to said low frequency current component, and wherein the detection circuit comprises: a current-voltage converter having an input coupled to the light-sensitive element and having an output terminal, a voltage-current converter having an output coupled to the input of the current-voltage converter, a low-pass filter with a cut-off frequency below the modulation frequency of the light source, means coupling the low-pass filter between the output terminal of the current-voltage converter and an input of the voltage-current converter thereby to complete a negative current feedback network that reduces said low frequency current component, and a signal transfer device coupling said output terminal of the current-voltage converter to an output terminal of the detection device and operative to inhibit said low-frequency current component and to pass a signal component at the modulation high frequency.

6. An optical end-of-tape detection device as claimed in claim 5, wherein the current-voltage converter comprises an op-amp having an inverting input that forms said input of the current-voltage converter, a non-inverting input coupled to a source of reference voltage, and an output coupled to the output terminal of the current-voltage converter, and wherein the voltage-current converter comprises a second op-amp having an inverting input coupled to its output and a non-inverting input forming the input of the voltage-current converter, the output of the second op-amp being coupled to the output of the voltage-current converter.

7. An optical end-of-tape detection device as claimed in claim 5, wherein the signal transfer device comprises: a differential amplifier having a first input coupled to the output terminal of the current-voltage converter and a second input coupled to said output terminal of the current-voltage converter via a switching device operated in synchronism with said light modulating means, a capacitor coupled to the second input of the differential amplifier, and means coupling an output of the differential amplifier to said output terminal of the detection device.

8. An optical end-of-tape device as claimed in claim 7, wherein the second input of the differential amplifier is coupled to a source of reference voltage, said light source comprises a light-emitting diode energized by a source of pulse-shaped voltage, and the light-sensitive element comprises a photo-transistor.

* * * * *